United States Patent [19]
Gill

[11] Patent Number: 6,072,671
[45] Date of Patent: Jun. 6, 2000

[54] WRITE HEAD WITH HIGH THERMAL STABILITY MATERIAL

[75] Inventor: Hardayal Singh Gill, Portola Valley, Calif.

[73] Assignee: International Business Machines Corporation, Armonk, N.Y.

[21] Appl. No.: 09/127,386

[22] Filed: Jul. 31, 1998

[51] Int. Cl.[7] ............................... G11B 5/31; G11B 5/39
[52] U.S. Cl. ............................. 360/126; 360/113
[58] Field of Search ..................... 360/113, 126, 360/125

[56] References Cited

U.S. PATENT DOCUMENTS

| | | | |
|---|---|---|---|
| 5,462,809 | 10/1995 | Berkowitz | 428/546 |
| 5,529,814 | 6/1996 | Tan et al. | 427/547 |
| 5,563,331 | 10/1996 | Von Helmolt et al. | 360/113 |
| 5,587,026 | 12/1996 | Iwasaki et al. | 148/313 |
| 5,589,221 | 12/1996 | Hiramoto et al. | 427/130 |
| 5,591,532 | 1/1997 | Berkowitz | 428/611 |
| 5,719,730 | 2/1998 | Chang et al. | 360/113 |

FOREIGN PATENT DOCUMENTS 0 791 915 A2  8/1997  European Pat. Off. .

OTHER PUBLICATIONS

IEEE Transactions on Magnetics, vol. 33, No. 5, Sep. 1997 "NiFe/CoFeB Spin–Valve Heads for Over 5 Gbit/in$_2$ Density Recording" pp. 2872–2874.

*Primary Examiner*—Craig A. Renner
*Attorney, Agent, or Firm*—Robert O. Guillot; Oppenheimer Wolff & Donnelly LLP

[57] ABSTRACT

A combined magnetic head (40) for a rotating magnetic media disk drive (30) wherein a write head portion (50) is structurally integral with a read head portion (52). During manufacture the read head portion (52) is exposed to high temperature in a magnetic field perpendicular to an air bearing surface (46) of the combined magnetic head (40). In order to prevent unwanted realignment of the P1 pole (78) and P2 pole (80) of the write head portion (50) the P1 pole (78) and (P2) pole are constructed from a class of materials known as nanocrystalline ferromagnetic oxides, which can withstand temperatures well in excess of the incident manufacturing conditions without succumbing to the unwanted effects.

34 Claims, 5 Drawing Sheets

WRITE HEAD WITH HIGH THERMAL STABILITY MATERIAL

TECHNICAL FIELD

The present invention relates to the field of combined read and write heads for reading and writing data and from rotating magnetic media, and more specifically to a high thermal stability material for use in the write poles of such heads. The predominant current usage of the present inventive spin valve head with high thermal stability material is in high capacity fixed disk data drive mechanisms.

BACKGROUND ART

In a combined read/write head (merged, "Piggyback", or types yet to be devised) using modem spin valve technology for the read head, it is necessary to pin a pinned layer of material in the read head after the entire head is assembled. The magnetization of the ferromagnetic pinned layer is pinned perpendicular to the air bearing surface. Most common method of pinning is by exchange pinning the ferromagnetic layer to an antiferromagnetic layer. This requires setting the pinned layer at an elevated temperature, above the blocking temperature of the antiferromagnet, in a magnetic field oriented perpendicular to the air bearing surface. For some antiferromagnetic systems, like NiMn, high temperature (250° C.) annealing may be required in a field oriented perpendicular to the ABS.

Unfortunately, the write head poles (P1 and P2) can be negatively impacted by exposure to such high temperatures. The annealing of the P1/P2 materials in a field oriented perpendicular to the ABS may induce a magnetic easy axis perpendicular to the ABS in the P1/P2 layers. The magnetic easy axis perpendicular to the ABS is not desirable for high frequency operation of the write head. Furthermore, such domains in the P1 layer is likely to negatively effect the operation of the adjacent read head.

Since the preferred construction for the read head appears to include the high temperature reset discussed above, it would be desirable to find some way to prevent the negative effects on the write poles which must be subjected to the same high temperature. However, to the inventor's knowledge no effective means or method for accomplishing this has existed in the prior art.

DISCLOSURE OF INVENTION

Accordingly, it is an object of the present invention to provide a way to prevent unwanted realignment of write pole layers during high temperature reset of a read head in a combination read/write head unit.

It is still another object of the present invention to provide a method and apparatus for preventing the degradation of magnetic materials during high temperature processes.

It is yet another object of the present invention to provide a method and apparatus for preventing the magnetic restructuring of a write head when the write head is simultaneously exposed to high temperatures and a magnetic field.

It is still another object of the present invention to provide an improved read/write head for magnetic media applications.

Briefly, the preferred embodiment of the present invention is a read/write head employing a spin valve type read head in associative combination with a write head, the write head having P1 and P2 magnetic poles. In order to prevent unwanted magnetic realignment of the P1 and P2 poles when a pinned layer of the read head is reset by exposing the read/write head to a high temperature and a magnetic field perpendicular to the air bearing surface of the read/write head, the P1 and P1 poles are constructed of a material which will withstand such exposure while retaining desired domain structure and granularity. Particular combinations and applications of such materials will vary as will be described in more detail hereinafter in relation to the particular embodiments of the invention.

An advantage of the present invention is that high frequency efficiency of a write head is retained.

A further advantage of the present invention is that write pole magnetic alignments will not negatively effect adjacent read heads.

Yet another advantage of the present invention is that high temperature processes can be used in the construction of combination read/write heads without negatively effecting the write head high frequency operational characteristics.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

Figure 1:
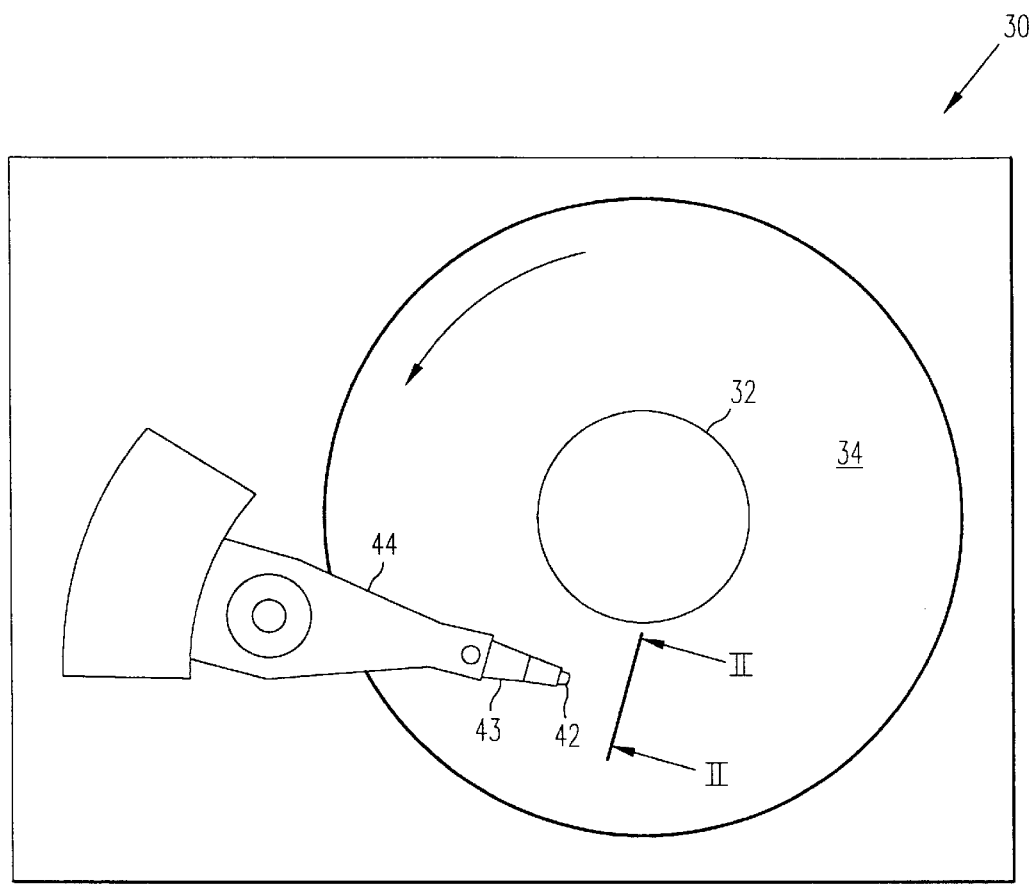
FIG. 1 is a planar view of an exemplary magnetic disk drive.
Figure 2:
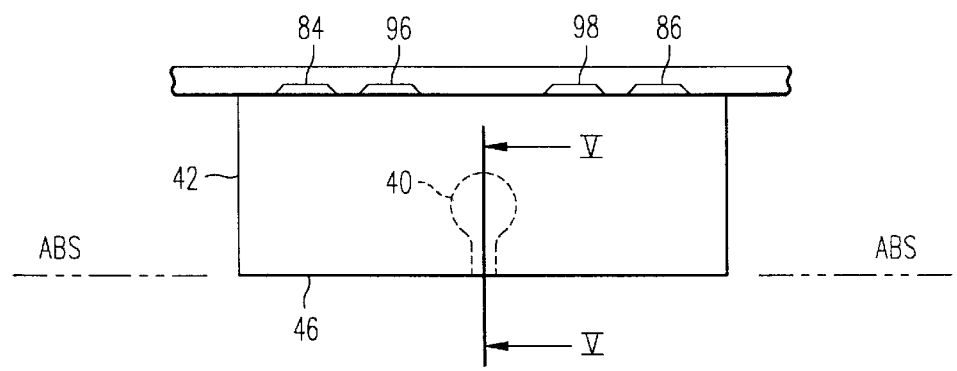
FIG. 2 is an end view of a slider with a magnetic head of the disk drive as seen in plane II—II of FIG. 1.
Figure 3:
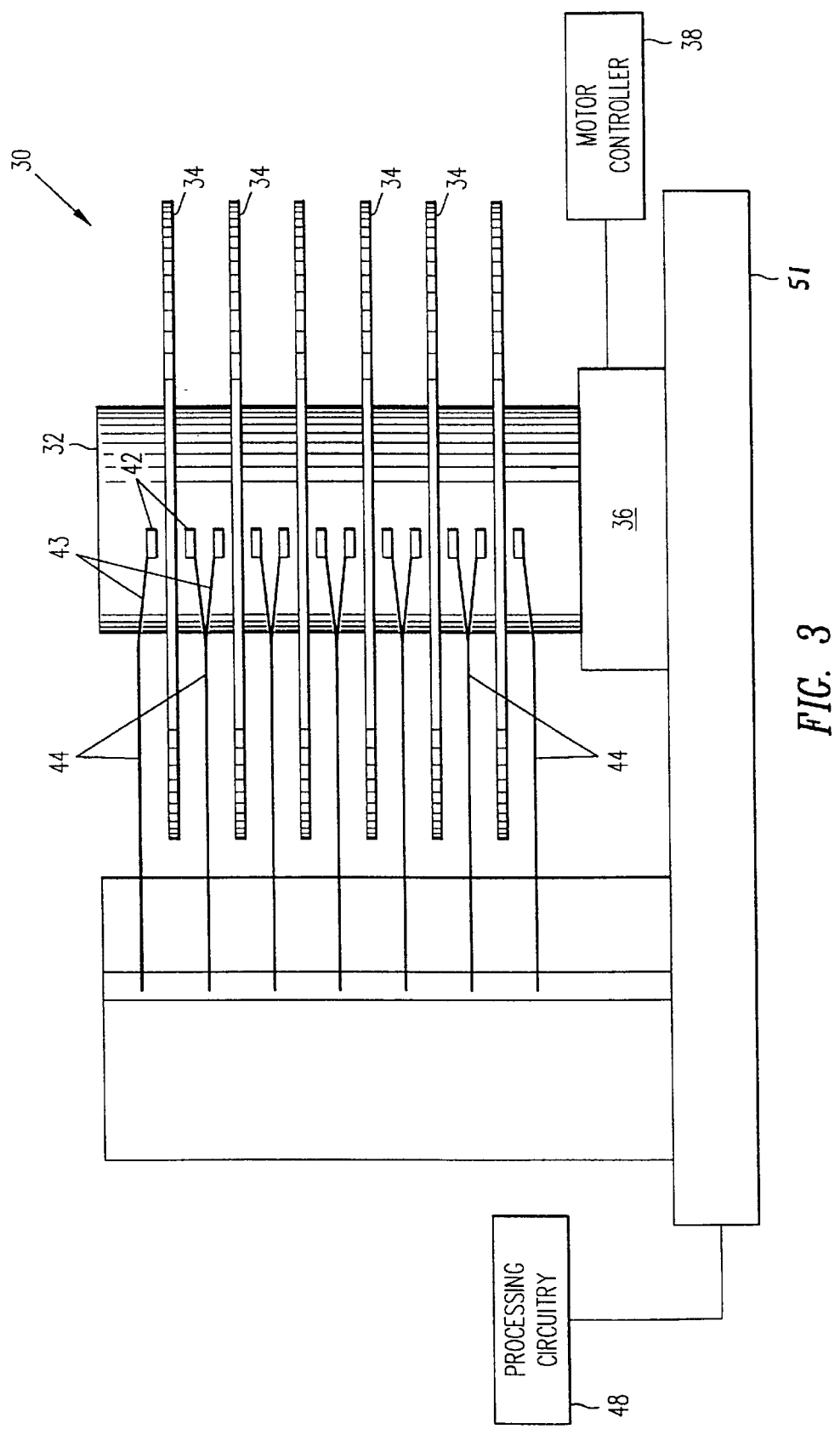
FIG. 3 is an elevational view of the magnetic disk drive wherein multiple disks and magnetic heads are employed.
Figure 4:
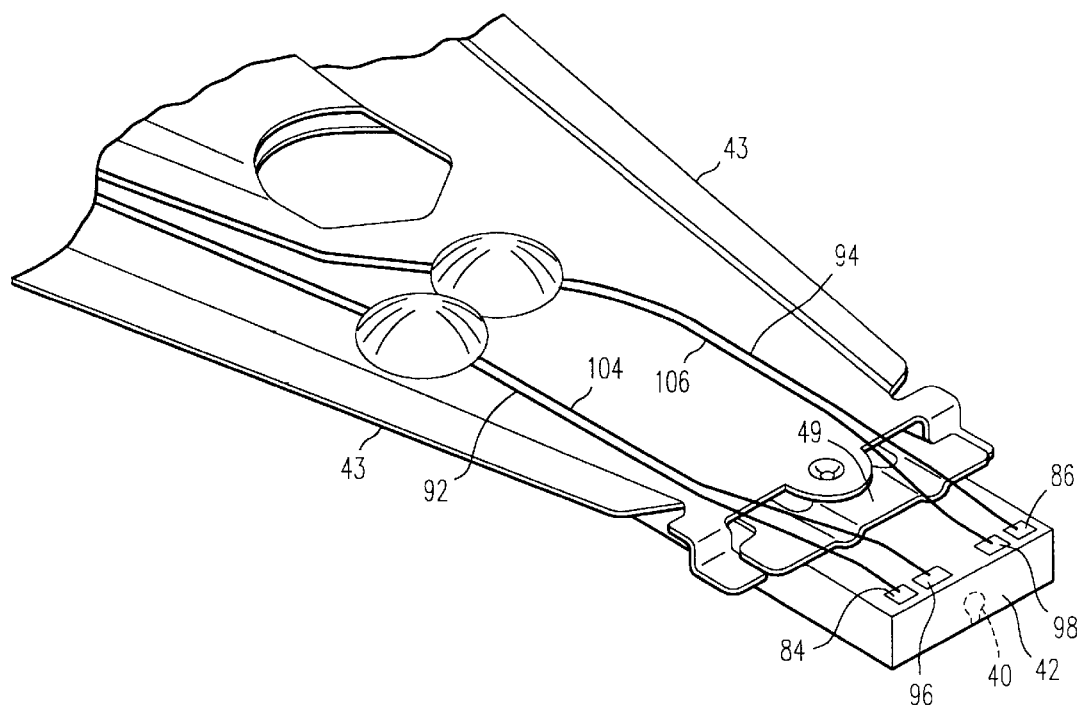
FIG. 4 is an isometric illustration of an exemplary suspension system for supporting the slider and magnetic head.

FIGS. 1 through 3 of the drawings illustrate a magnetic disk drive 30. The drive 30 includes a spindle 32 which supports and rotates a magnetic disk 34. The spindle 32 is rotated by a motor 36 which, in turn, is controlled by a motor controller 38. A combined magnetic head 40 for reading and recording is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36, the slider is supported on a thin (typically 0.05 μm) cushion of air (air bearing) by the air bearing surface (ABS) 46. The magnetic head 40 may then be employed for writing information to multiple circular tracks on the surface of the disk 34, as well as for reading information therefrom. Processing circuitry 48 exchanges signals representing such information with the head 40, provides motor drive signals, and also provides control signals for moving the slider to various tracks. In FIG. 4, the slider 42 is shown mounted to a head gimbal assembly (HGA) 49 which, in turn, is mounted to the suspension 43. The components described hereinabove may be mounted on a frame 51 (FIG. 3).

Figure 5:
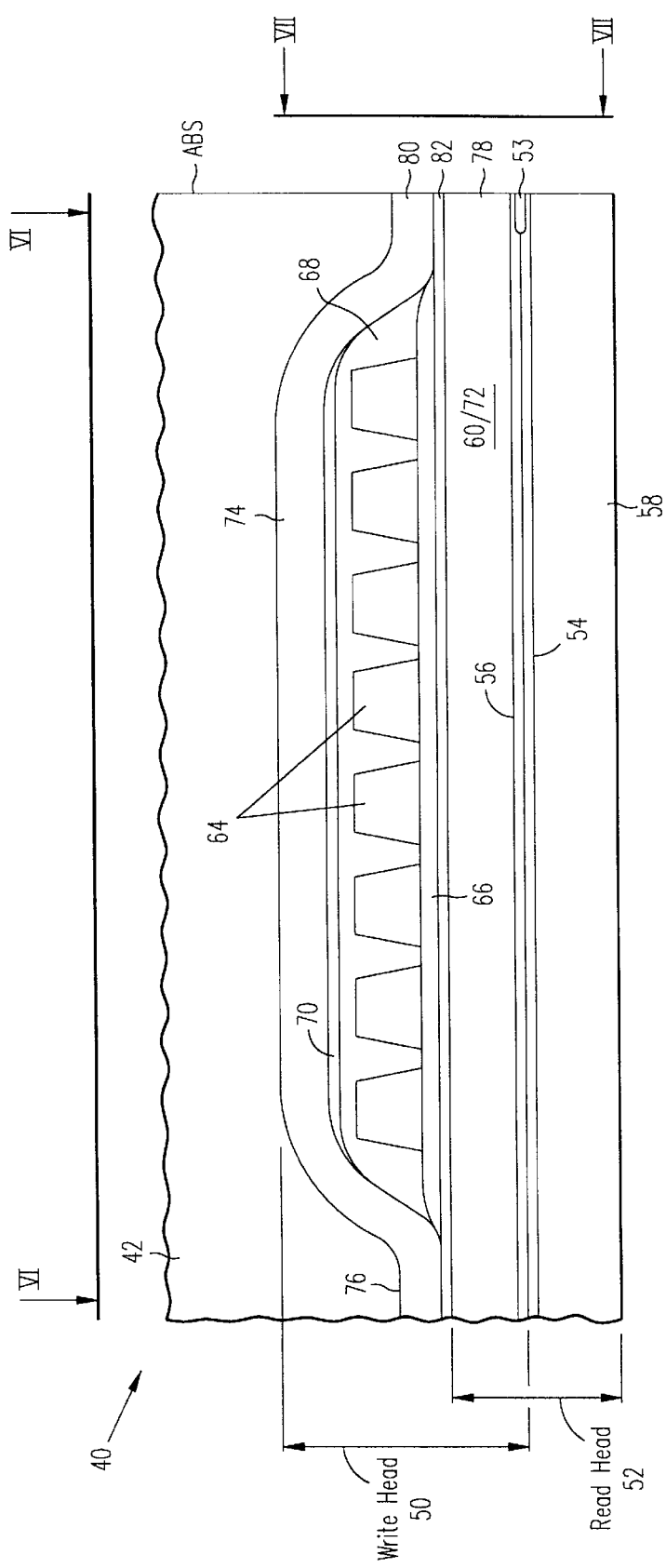
FIG. 5 is a partial view of the slider and magnetic head as seen in plane V—V of FIG. 2.
Figure 7:
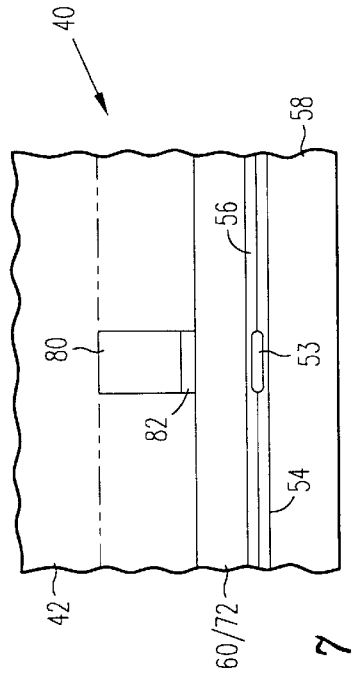
FIG. 7 is a partial ABS view of the slider taken along plane VII—VII to show the read and write elements of the magnetic head.

FIG. 5 is a side cross-sectional elevation view of the magnetic head 40 which has a write head portion 50 and a read head portion 52, the read head portion 52 employing a magnetoresistive ("MR") spin valve sensor 53 (which might be AMR, GMR, as those terms are well defined in the art, or other type yet to be devised). FIG. 7 is an ABS view of FIG. 5. The MR sensor 53 is sandwiched between first and second gap layers 54 and 56 and the gap layers are sandwiched between first and second shield layers 58 and 60. In response to external magnetic fields, the resistance of the MR sensor 53 changes. A sense current $I_s$ applied to the sensor causes these resistance changes to be manifested as potential changes. These potential changes are then processed by the processing circuitry 48 shown in FIG. 3.

Figure 6:
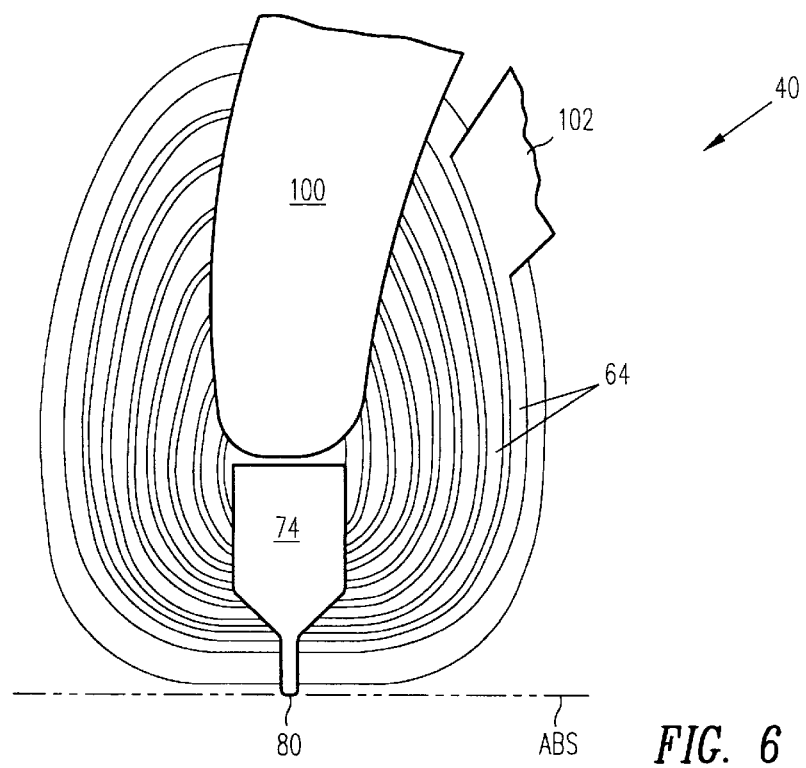
FIG. 6 is a view taken along plane VI—VI of FIG. 5 with all material above the second pole piece removed.

The write head portion 50 of the magnetic head 40 has a coil layer 64 sandwiched between first and second insulation layers 66 and 68. A third insulation layer 70 may optionally be employed for planarizing the head to eliminate ripples in the second insulation layer caused by the coil layer 64. The first, second and third insulation layers are referred to in the art as an "insulation stack". The coil layer 64, and the first, second and third insulation layers 66, 68 and 70 are sandwiched between first and second pole piece layers 72 and 74. The first and second pole piece layers 72 and 74 are magnetically coupled at a back gap 76 and have first and second pole tips 78 and 80 which are separated by a gap layer 82 at the ABS. As shown in FIGS. 2 and 4, first and second solder connections 84 and 86 connect leads from the MR sensor 53 to leads 92 and 94 on the suspension 43 and third and fourth solder connections 96 and 98 connect leads 100 and 102 form the coil 64 (see FIG. 6) to leads 104 and 106 on the suspension.

According to the present invention, the P1 and P2 poles 72 and 74 of the write head 50 are constructed from materials which do not respond to magnetic annealing up to very high temperatures (>400° C.). The is well above temperatures to which the combined magnetic head 40 is exposed during the magnetic annealing (in a field perpendicular to the ABS 46)—generally in the range of approximately 200° C. to 250° C.—to which the combined magnetic head 40 is exposed during reset of the write head portion 50, as well as during other high temperature operations to which the combined magnetic head 40 must be exposed. As will be described in more detail below, in one embodiment of the invention only the P1 pole 78 is modified according to the present invention, and in another embodiment of the invention both the P1 pole 78 and the P2 pole 80 are so treated. Materials considerations differ somewhat according to which of these embodiments is being considered, as discussed hereinafter.

Figure 8:
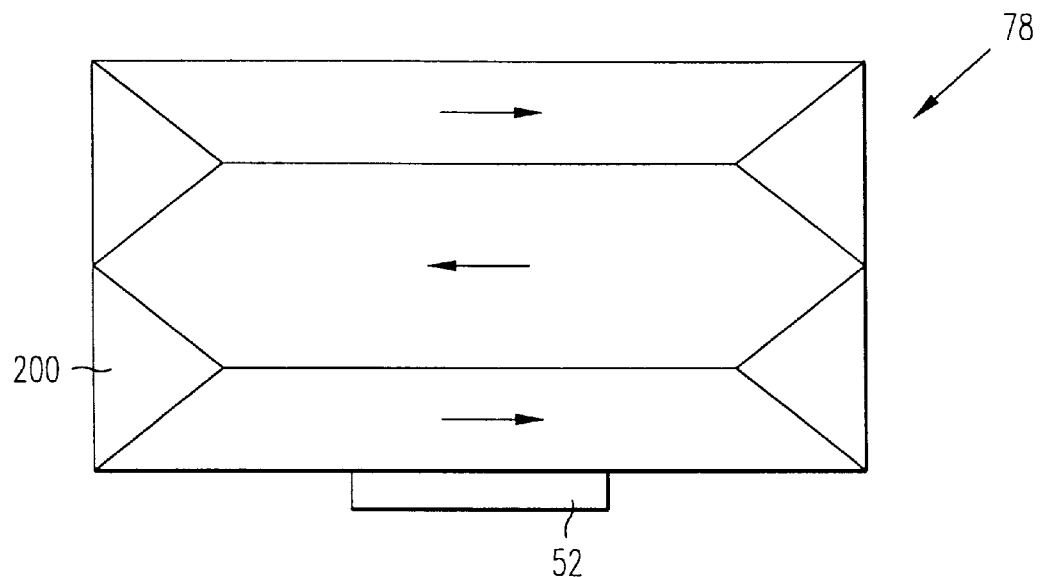
FIG. 8 is a diagrammatic representation of a write head pole structure showing the orientation of magnetic domains therein.
Figure 9:
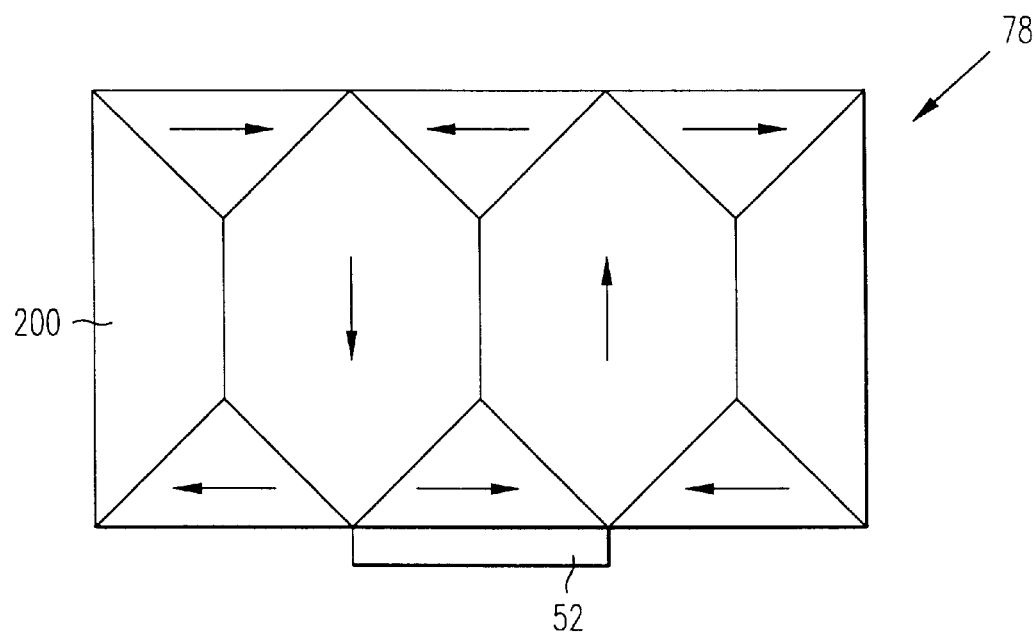
FIG. 9 is another diagrammatic representation of a write head pole structure showing the orientation of magnetic domains therein.

FIGS. 8 and 9 are diagrammatic representations of the P1 pole 78 showing the read head 52 adjacent thereto. A plurality of magnetic domains 200 are depicted in diagrammatic form, along with their orientations (represented by arrows) in the views of FIGS. 8 and 9. FIG. 8 is an example of a desired orientation of the magnetic domains 200, while FIG. 9 is an example of an unstable domain 200 configuration which would negatively affect high frequency performance and negatively impact the adjacent read head 52.

In order to correct the above described problem, the materials employed in the inventive improved P1 pole 78 and P2 pole 80 are from a class of materials based on FeCoHfO (nanocrystalline ferromagnetic oxides) which do not respond to magnetic annealing up to very high temperatures (>400° C.). This is due to formation of two phases of material, an FeCo crystalline phase and an amorphous phase (Hf oxide). The small grain size of this material is also due to reduced atomic scale diffusion.

The composition of about 62% iron, 17% cobalt, 11% hafnium, 10% oxygen ($Fe_{62}Co_{17}Hf_{11}O_{10}$) possess suitable properties for write head applications: The properties considered necessary or desirable are:

1) Very high resistivity (>400 $\mu$OhmCm)
2) High magnetization (1.5T)
3) High permeability at high frequency The material can be deposited (to form the P1 78 and/or P2 80 poles) by reactive sputtering process. The Co concentration can be adjusted to achieve desirable magnetic anisotropy. The Fe concentration is kept high to achieve high magnetization. The amount of Hf and Oxide are adjusted to achieve desirable thermal stability and magnetostriction. It is anticipated that, if desired, this material could also be used by forming FeCoHfo/$Al_2O_3$ lamination. In such a configuration the AlO would act as dielectric. This would prevent eddy currents in the poles 78 and 80 and thereby further improve high frequency response.

One skilled in the art will recognize that the inventive P1 pole 78 and P2 pole 80 are made of materials having a low activation energy, since unwanted diffusion can occur at low temperatures in materials having a high activation energy. Also, the very fine grain size of the materials disclosed means that grain boundaries are essentially nonexistent, thereby further reducing the possibility of unwanted diffusion into adjacent material layers.

It should be noted that where the inventive construction is used in the P1 pole 78 only, the magnetic moment is not of particular import. However, one skilled in the art will recognize that the P2 pole 80 requires a material having a high magnetic moment. This is because the coercivity of the magnetic disk 34 used in modern disk drives 30 is becoming higher and higher, thereby requiring high and higher moments in the P2 pole 80. Therefore, it is anticipated by the inventor that higher proportions of oxygen and hafnium might be used in the construction of the P1 pole 78 while, in order to maintain the required high moment, as much iron as possible (and some cobalt) should be used with perhaps as little as 5% hafnium and 5% oxygen. Indeed, it is in fact preferred that the P1 78 pole have a low magnetic moment, because the P1 pole 78 is located nearer to the spin valve sensor 53 and would steal flux from the spin valve sensor 53 were the P1 pole to have a higher magnetic moment. However, the P1 pole 78 does require a high thermal stability. Accordingly, the proportions of hafnium, oxygen, iron and cobalt can be adjusted according to the application, keeping in mind the consideration that the hafnium and oxygen (non magnetic elements) will improve thermal stability, while increases in the proportion of iron and/or cobalt will improve the moment.

It should be noted that, although hafnium is used in the embodiment described. the inventor has found that zirconium (Zr) or niobium (Nb) could be substituted therefore.

Various modifications may be made to the invention without altering its value or scope. For example, other structures of the combined magnetic head 40, both those known and those yet to be invented, could readily use the inventive write head construction described herein.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

What is claimed is:

1. A magnetic write head, comprising:

two magnetic pole structures (P1 and P2) wherein at least one of said two magnetic pole structures is constructed of a nanocrystalline ferromagnetic oxide.

2. The magnetic write head of claim 1, wherein:

said nanocrystalline ferromagnetic oxide magnetic pole structure includes a combination of iron, cobalt, and oxygen.

3. The magnetic write head of claim 2, wherein:

iron is present in said nanocrystalline ferromagnetic oxide magnetic pole structure in the range of from 40% to 90%.

4. The magnetic write head of claim 2, wherein:

cobalt is present in said nanocrystalline ferromagnetic oxide magnetic pole structure in the range of from 5% to 30%.

5. The magnetic write head of claim 2, wherein:

oxygen is present in said nanocrystalline ferromagnetic oxide magnetic pole structure in the range of from 2% to 25%.

6. The magnetic write head of claim 2, and further including:

hafnium present in said nanocrystalline ferromagnetic oxide magnetic pole structure in the range of from 5% to 25%.

7. The magnetic write head of claim 2, and further including:

zirconium present in said nanocrystalline ferromagnetic oxide magnetic pole structure in the range of from 5% to 25%.

8. The magnetic write head of claim 2, and further including:

niobium present in said nanocrystalline ferromagnetic oxide magnetic pole structure in the range of from 5% to 25%.

9. The magnetic write head of claim 6, wherein:

said nanocrystalline ferromagnetic oxide magnetic pole structure includes $Fe_{62}Co_{17}Hf_{11}O_{10}$.

10. The magnetic write head of claim 1, wherein:

said P1 pole structure is constructed of a nanocrystalline ferromagnetic oxide.

11. The magnetic write head of claim 1, wherein:

both said P1 pole structure and said P2 pole structure are constructed of a nanocrystalline ferromagnetic oxide.

12. A combined magnetic head for reading from and writing to magnetic media, comprising:

a read head;

a first write head pole made from a nanocrystalline ferromagnetic oxide; and a second write head pole.

13. The combined magnetic head of claim 12, wherein:

said read head includes a spin valve sensor.

14. The combined magnetic head of claim 12, wherein:

said first write head pole includes a ferrous element in the range from about 30% through about 90%.

15. The combined magnetic head of claim 12, wherein:

said first write head pole includes iron in the range from about 40% through about 90%.

16. The combined magnetic head of claim 12, wherein:

said first write head pole includes approximately 62 percent iron.

17. The combined magnetic head of claim 12, wherein:

said first write head pole includes cobalt in the range from about 5% through about 30%.

18. The combined magnetic head of claim 12, wherein:

said first write head pole includes approximately 17% cobalt.

19. The combined magnetic head of claim 12, wherein:

said first write head pole includes oxygen in the range from about 2% through about 25%.

20. The combined magnetic head of claim 12, wherein:

said first write head pole includes approximately 10 percent oxygen.

21. The combined magnetic head of claim 12, wherein:

said first write head pole includes hafnium in the range from about 5% through about 25%.

22. The combined magnetic head of claim 12, wherein:

said first write head pole includes approximately 11 percent hafnium.

23. The combined magnetic head of claim 12, wherein:

said first write head pole includes zirconium in the range from about 5% through about 25%.

24. The combined magnetic head of claim 12, wherein:

said first write head pole includes approximately 11 percent zirconium.

25. The combined magnetic head of claim 12, wherein:

said first write head pole includes niobium in the range from about 5% through about 25%.

26. The combined magnetic head of claim 12, wherein:

said first write head pole includes approximately 11 percent niobium.

27. The combined magnetic head of claim 12, wherein:

said first write head pole has at least a portion thereof made up of a combination of approximately 62 parts of iron, approximately 17 parts of cobalt, approximately 10 parts of oxygen and approximately 11 parts of an element selected from the group of hafnium, niobium, and zirconium.

28. The combined magnetic head of claim 12, wherein:

at least a portion of said second write head pole is constructed from a nanocrystalline ferromagnetic oxide.

29. A magnetic disk drive comprising:

at least one rotating magnetic medium;

a slider;

a positioning coil for positioning said slider; and a head affixed to said slider such that said head may be positioned relative to said rotating magnetic medium by the action of moving said slider with said positioning coil; wherein said head includes a spin valve sensor and a write head portion including a first magnetic pole structure and a second magnetic pole structure, where said first pole structure has at least a portion thereof constructed from a nanocrystalline ferromagnetic oxide.

30. The magnetic disk drive of claim 29, wherein.

said second pole structure has at least a portion thereof constructed from a nanocrystalline ferromagnetic oxide.

31. The magnetic disk drive of claim 30, wherein:

said nanocrystalline ferromagnetic oxide of at least one of said first and said second magnetic pole structure is a combination including iron, cobalt and oxygen.

32. The magnetic disk drive of claim 31, wherein:

said nanocrystalline ferromagnetic oxide that includes iron, cobalt and oxygen further includes hafnium.

33. The magnetic disk drive of claim 31, wherein:

said nanocrystalline ferromagnetic oxide that includes iron, cobalt and oxygen further includes zirconium.

34. The magnetic disk drive of claim 31, wherein:

said nanocrystalline ferromagnetic oxide that includes iron. cobalt and oxygen further includes niobium.

* * * * *